United States Patent
Dordan

(10) Patent No.: US 10,136,706 B2
(45) Date of Patent: Nov. 27, 2018

(54) TOUCH SCREEN ELECTRONIC DEVICE WITH AT LEAST ONE FASTENER MEMBER, AND THE KIT AND METHOD FOR PLACING, HOLDING AND MOUNTING SUCH DEVICES USING AT LEAST ONE HOOK AND ONE LOOP OF FASTENER TECHNOLOGY

(71) Applicant: Lorena Dordan, Garden Grove, CA (US)

(72) Inventor: Lorena Dordan, Garden Grove, CA (US)

( * ) Notice: Subject to any disclaimer, the term of this patent is extended or adjusted under 35 U.S.C. 154(b) by 41 days.

(21) Appl. No.: 14/939,618

(22) Filed: Nov. 12, 2015

(65) Prior Publication Data

US 2017/0142846 A1    May 18, 2017

(51) Int. Cl.
*H05K 5/00*      (2006.01)
*A44B 18/00*     (2006.01)
(Continued)

(52) U.S. Cl.
CPC ............ *A44B 18/0084* (2013.01); *F16B 1/00* (2013.01); *F16B 2/08* (2013.01); *F16B 11/006* (2013.01); *F16B 2001/0028* (2013.01)

(58) Field of Classification Search
CPC ...... G06F 1/1607; G06F 1/1654; G06F 3/041; A44B 18/0084; F16B 1/00; F16B 11/006; F16B 2/08; F16B 2001/0028
See application file for complete search history.

(56) References Cited

U.S. PATENT DOCUMENTS

| 8,141,948 | B2* | 3/2012 | Cassellia | B60K 35/00 297/188.04 |
| 8,837,120 | B2* | 9/2014 | Busalt | G09F 9/35 361/679.01 |

(Continued)

OTHER PUBLICATIONS

USPTO, Advanced Claim Drafting, Aug. 15-16, 2014, USPTO Alexandria VA, 16th Annual Independent Inventors Conference.*

*Primary Examiner* — Michael C Zarroli

(57) ABSTRACT

The present invention discloses a kit for holding and mounting portable electronic devices in different places quickly and easily; comprising at least one electronic devices, at least one adhesive accessory, and at least one case, cover, or protective cover for strap; where each of these parts comprises at least one hook and loop fastening element, positioned, joined, adapted, adhered, coupled, configured, connected and adjusted to its structure; The whole kit provides a greater level of versatility, maneuverability, and practicality to the functions of the electronic device.

Any of the parts of the kit, whether the case, cover, or protective cover, the accessory, and the strap; they may be joined and separated when convenient by the user, thanks to the provisions, features, and characteristics of the hook and loop fastener that each of these possess; which generates an adhesive union without the need to use tools or alternative elements and materials.

Finally, the kit presentation is provided in one or more colors, shapes or special designs; including transparent designs to provide consumers with options to meet the needs of their devices. In addition, the kit appears in a variety of shapes, designs, sizes and types for any desired utility.

7 Claims, 12 Drawing Sheets

(51) Int. Cl.
*F16B 1/00* (2006.01)
*F16B 11/00* (2006.01)
*F16B 2/08* (2006.01)

(56) References Cited

U.S. PATENT DOCUMENTS

| | | | |
|---|---|---|---|
| 9,033,384 B2* | 5/2015 | Potter | A45F 5/10 |
| | | | 294/25 |
| 9,182,075 B2* | 11/2015 | Crosby | F16B 47/003 |
| 2005/0057921 A1* | 3/2005 | Menosky | B62J 6/02 |
| | | | 362/110 |
| 2005/0073506 A1* | 4/2005 | Durso | E05B 73/0082 |
| | | | 345/173 |
| 2006/0071045 A1* | 4/2006 | Walters | A45F 5/02 |
| | | | 224/673 |
| 2013/0020451 A1* | 1/2013 | O'Reilly | F16M 13/00 |
| | | | 248/205.3 |
| 2014/0038720 A1* | 2/2014 | Reeskamp | A63F 13/02 |
| | | | 463/40 |
| 2014/0368993 A1* | 12/2014 | Sun | G06F 1/1656 |
| | | | 361/679.55 |
| 2016/0173670 A1* | 6/2016 | Langhein | H04M 1/04 |
| | | | 455/575.1 |
| 2016/0183393 A1* | 6/2016 | Groom | A45C 11/00 |
| | | | 280/33.992 |
| 2017/0089377 A1* | 3/2017 | Runge | F16B 11/006 |
| 2017/0127869 A1* | 5/2017 | Milkowski | A47G 33/10 |

* cited by examiner

FIG. 1 - A
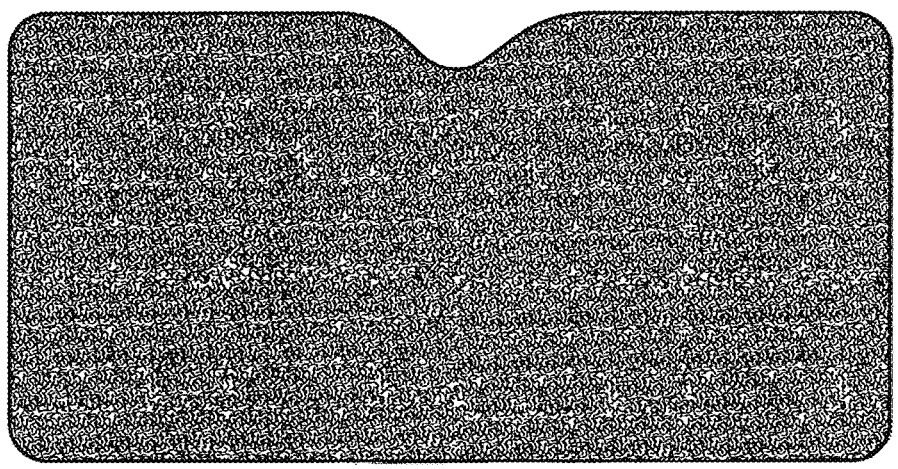
FIG. 1 - B
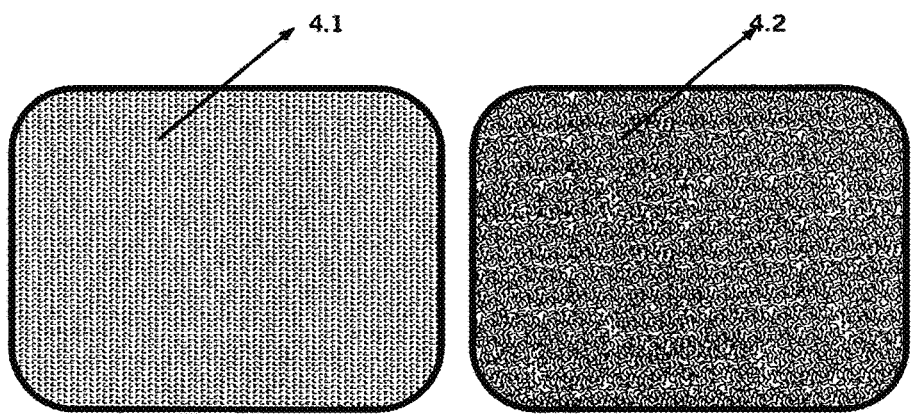

FIG. 1 - C
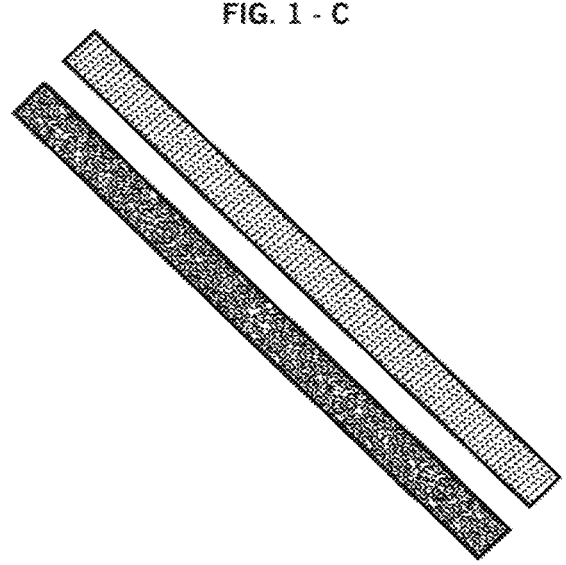
FIG. 1 - D
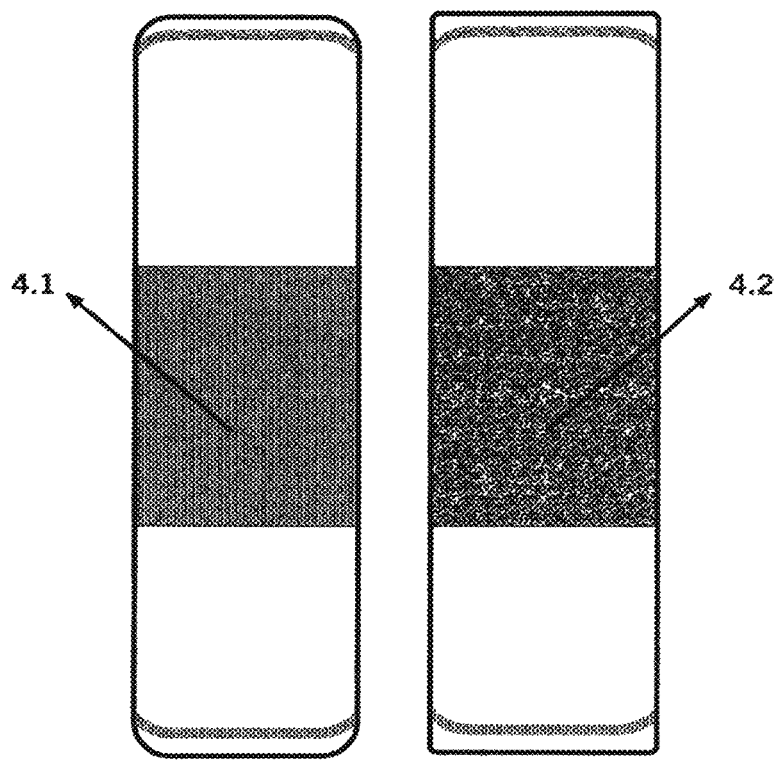

FIG. 1 - E
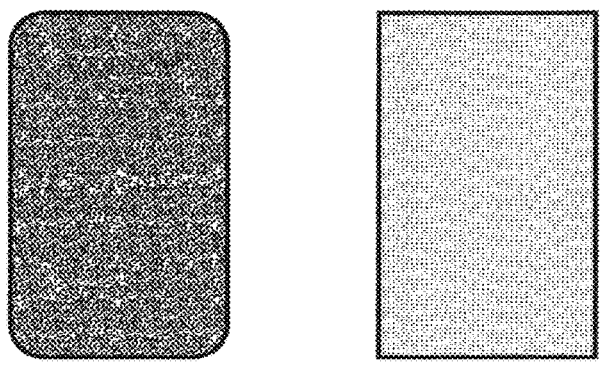
FIG. 1 - F
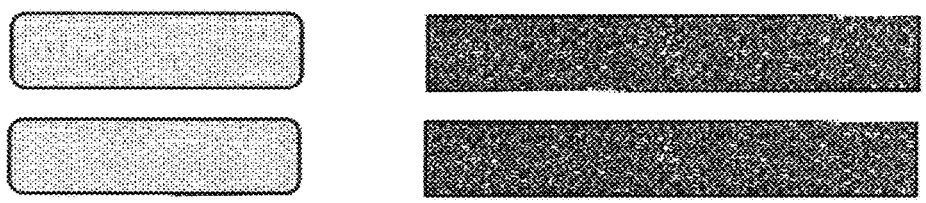
FIG. 1 - G
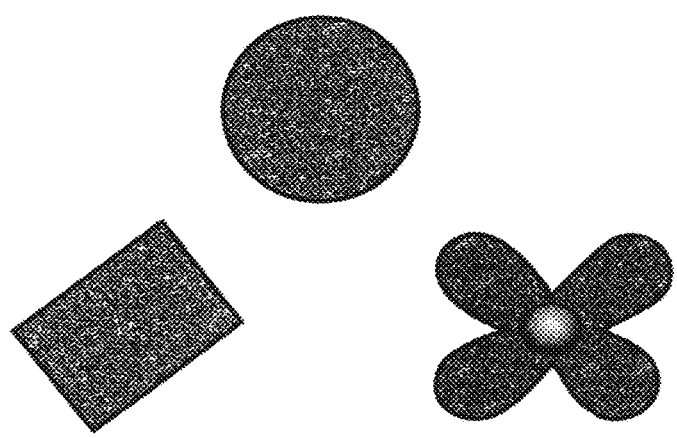

FIG. 2 - A
FIG. 2 - B
FIG. 2 - C
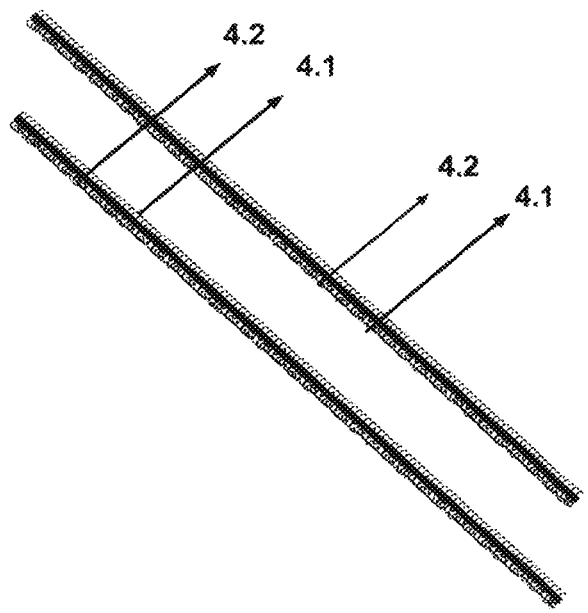

FIG. 2 - D
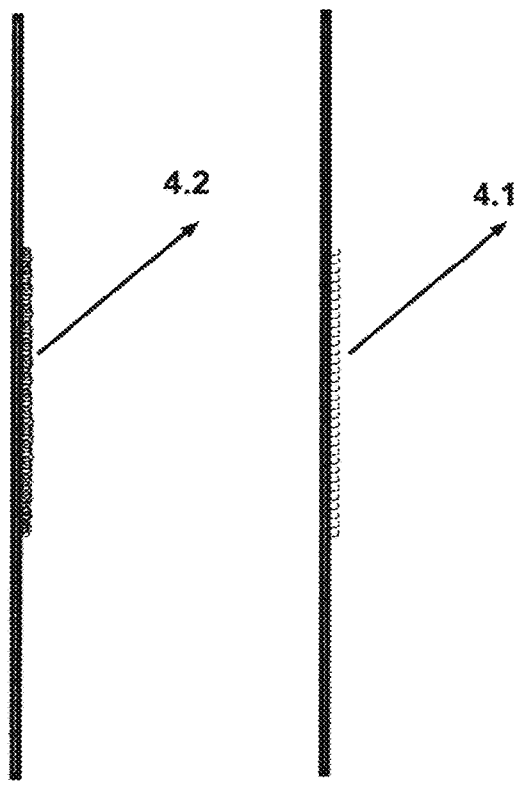
FIG. 2 - E
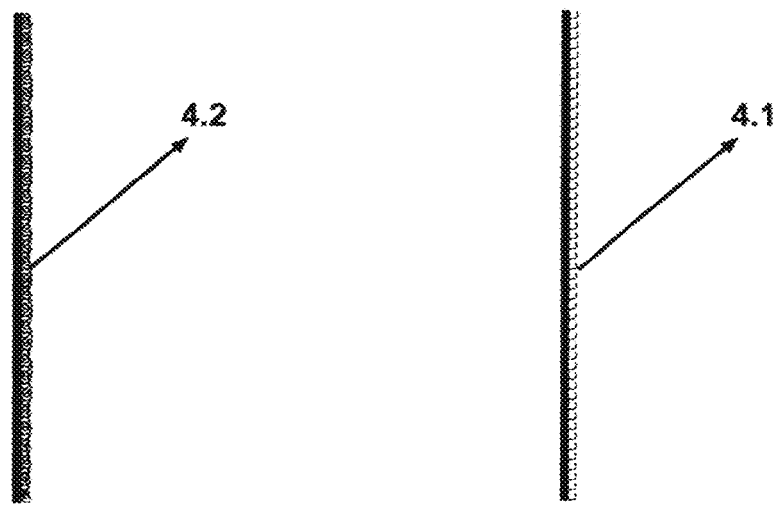

FIG. 2 - F
FIG. 2 - G
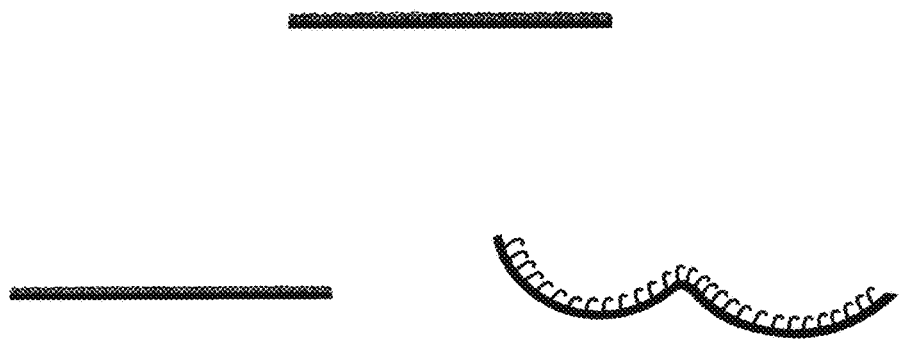

FIG. 3 - A
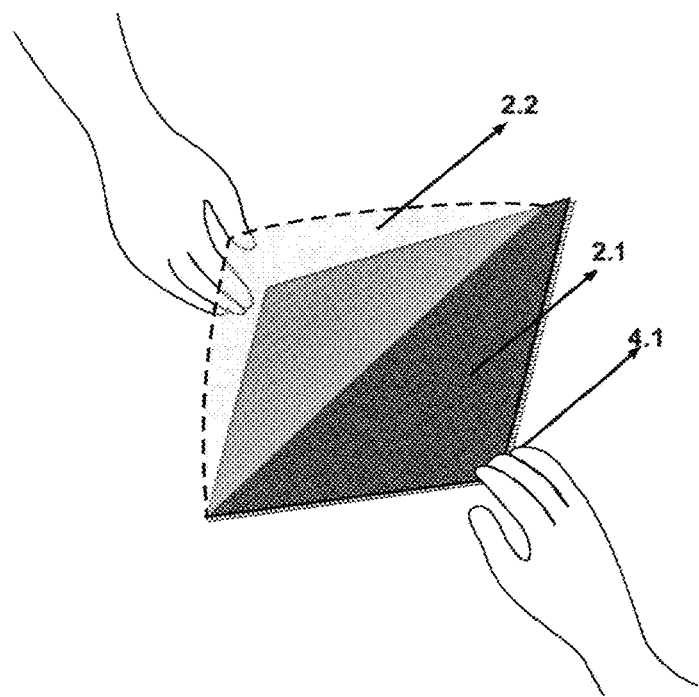
FIG. 3 - B
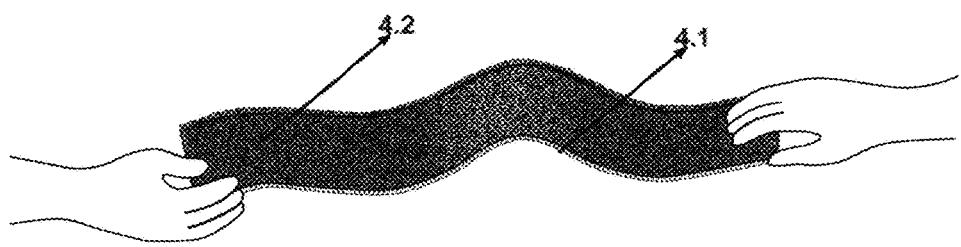

FIG. 4 - A
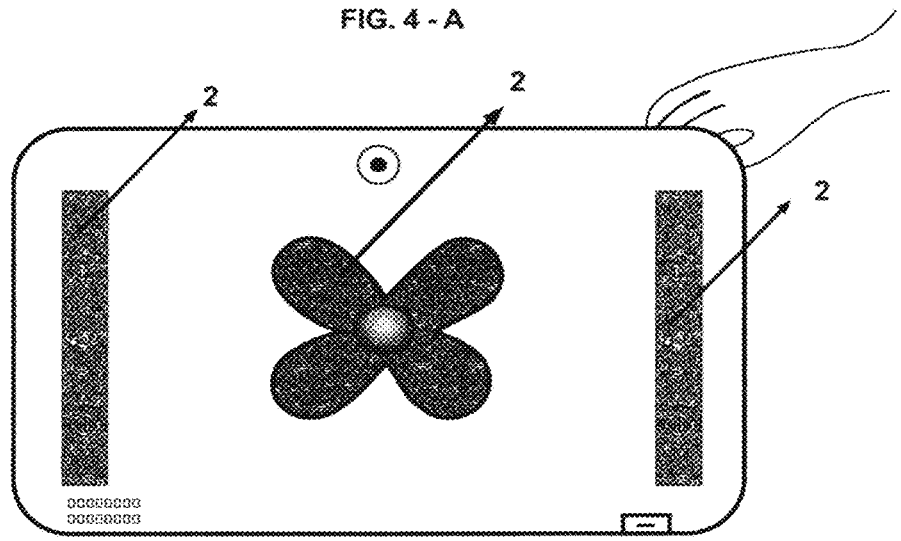
FIG. 4 - B
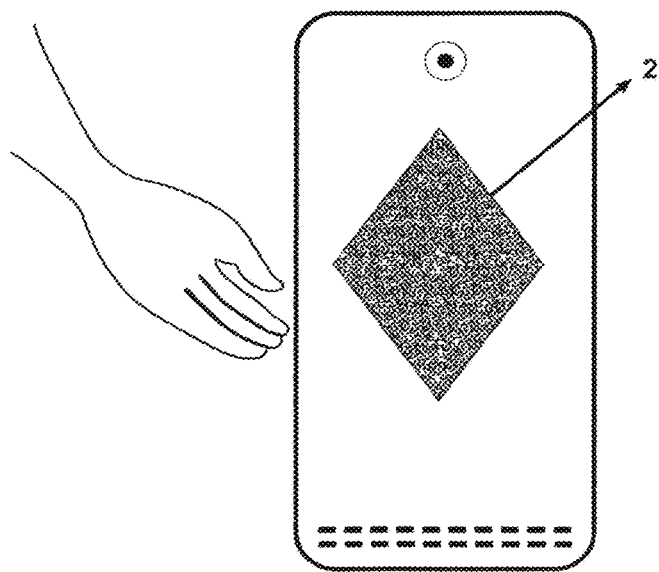

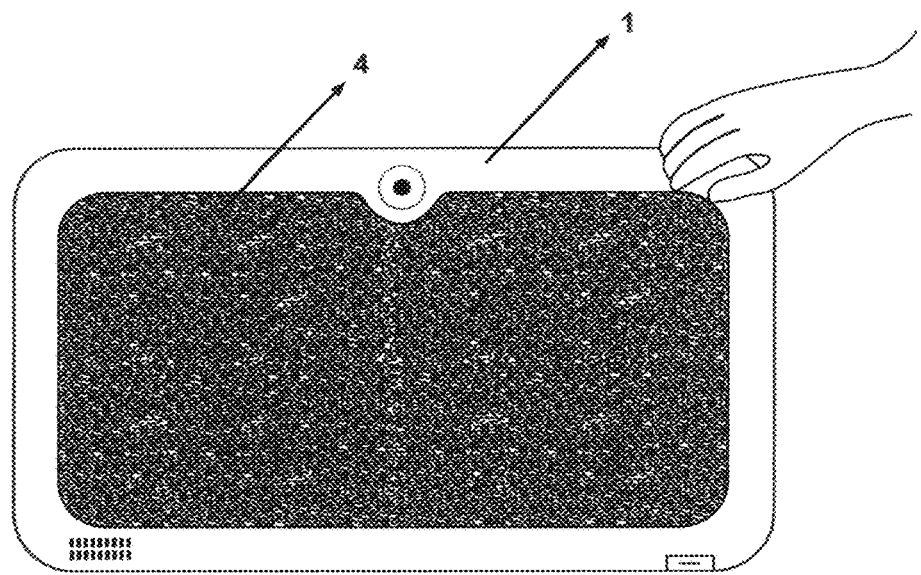
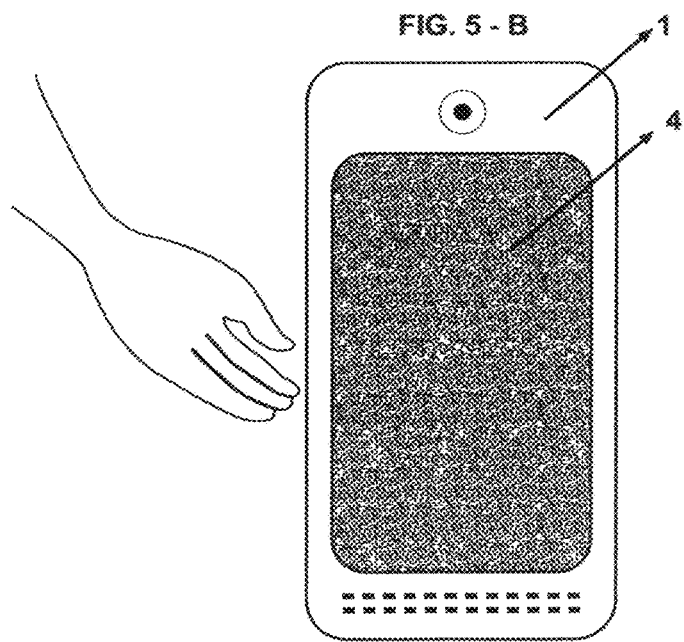

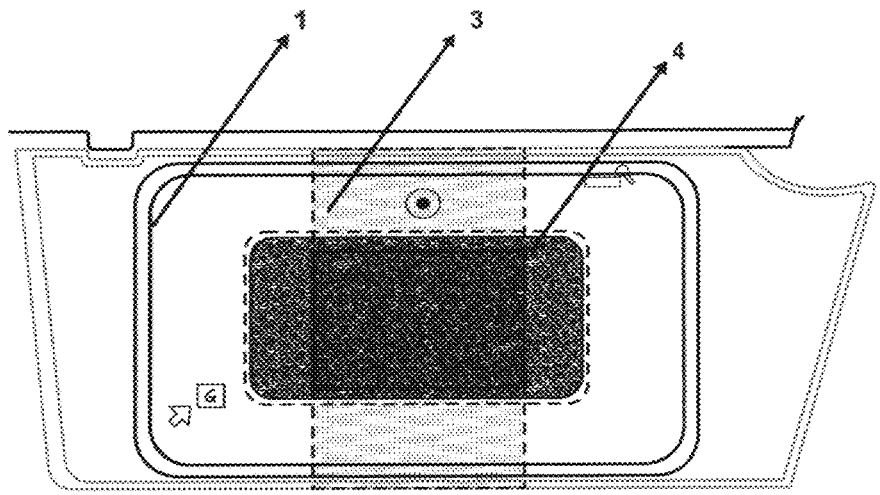
FIG. 6 - A
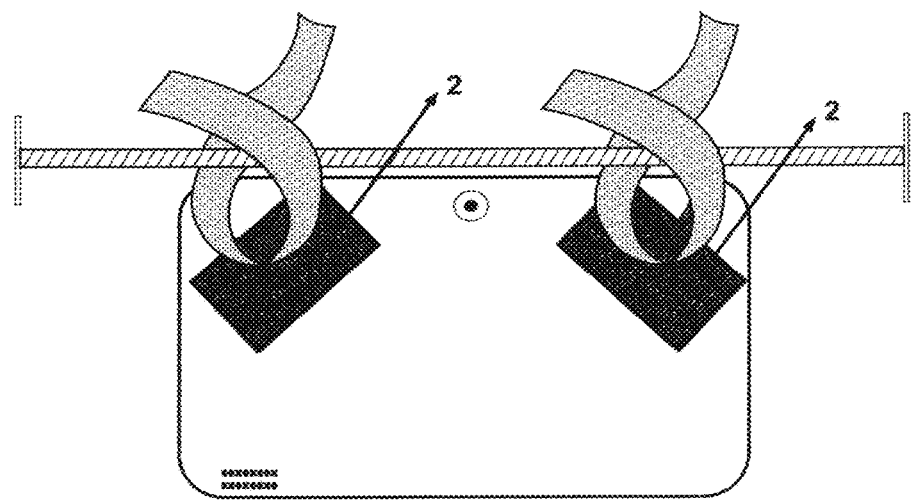
FIG. 6 - B

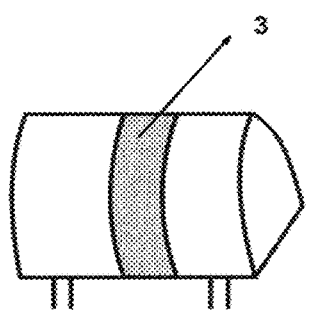
FIG. 7 - A
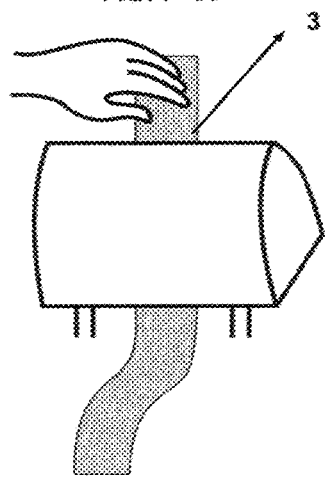
FIG. 7 - B
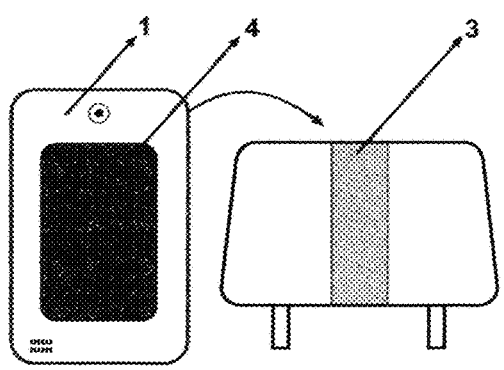
FIG. 7 - C
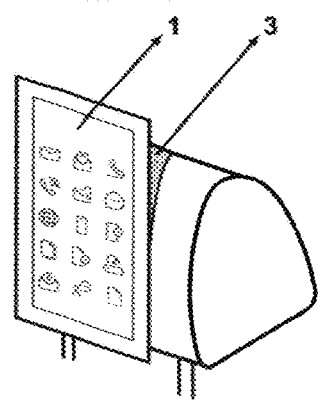
FIG. 7 - D

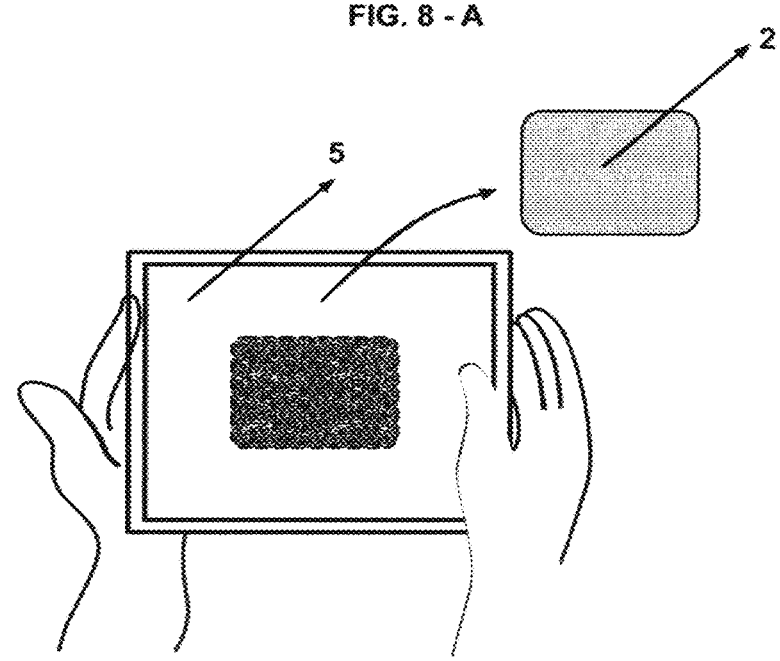
FIG. 8 - A
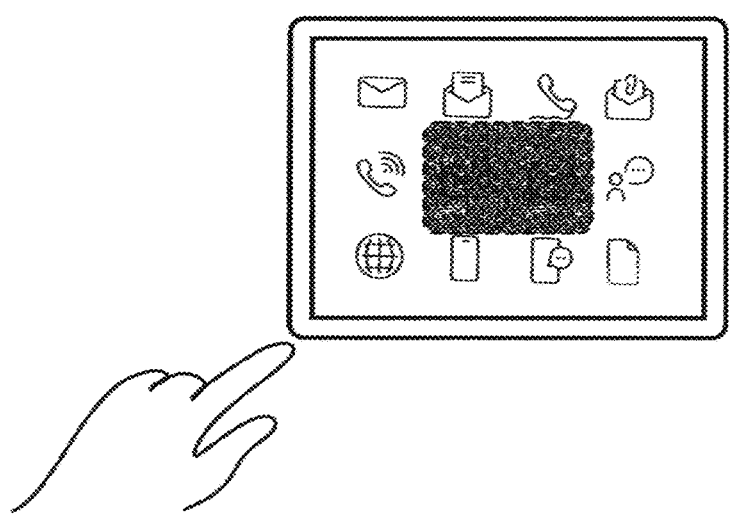
FIG. 8 - B

TOUCH SCREEN ELECTRONIC DEVICE WITH AT LEAST ONE FASTENER MEMBER, AND THE KIT AND METHOD FOR PLACING, HOLDING AND MOUNTING SUCH DEVICES USING AT LEAST ONE HOOK AND ONE LOOP OF FASTENER TECHNOLOGY

TECHNICAL FIELD

The present invention relates to a kit for portable touch-screen electronic devices, which includes at least one hook and loop fastener member of temporary or permanent affixation that allows the portable electronic touch screen device most commonly known as a Smartphone, Android Phone, iPhone, Tablet, iPad and all similar devices to acquire extreme mounting capabilities, greater maneuverability, and enhanced daily practicality.

This new function of temporary or permanent affixation allows the portable electronic touch screen devices to be placed and mounted in different locations quickly and easily, without the need to have other elements, materials, products or tools.

STATE OF THE ART

In recent years, the market for portable touchscreen electronic devices, most commonly known as Smartphones, Android Phones, Tablets, iPads, and similar devices have become hugely popular in the commercial and residential sectors. However, these devices do not allow the user to adjust, adhere or mount the electronic devices on different surfaces and locations without the need to use at least another product, material or element that allows the device to be placed, held, hung, or mounted in different areas and for different functionalities.

To solve this drawback, a new product market created products such as: tablet stands, tablet racks, clips of smartphones, kitchen stands for tablets, cases with attached clips, hand covers with magnets and also with some accessories of hook and loop, other clips and cords with metallic or plastic structures, magnets, plastic suction cup holders for vehicles and other places, etcetera.

Also the patent document WO2017162897A1 ("TEMPORARY ATTACHMENT ACCESSORY FOR AN ELECTRONIC DEVICE"); which states: The invention relates to a temporary attachment accessory for an electronic device, characterized in that it comprises: a body (1) having an edge (2) designed such that the body (1) bends about the edge (2); a first gluing element (3) which in turn has a first face (4) immovably glued on one side to the body (1), and a second face (5) comprising a glue designed to attach the accessory to any surface; a second gluing element (6) which in turn comprises a first face (7) suitable for attaching the accessory to the electronic device, and a second face (8) immovably attached to the body (1) in the same position as the first gluing element (3) but on an opposite side of the body (1).

And the patent document US2013020451A1 ("INTERACTIVE VISUAL DISPLAY SYSTEM"); which discloses a system for mounting a display device, such as a touch screen interface unit, comprising: an electronic display; a base adapted to be fixed by a fastener element to a surface; a frame that receives the screen and held by at least one mechanical fastener to the base.

However, the aforementioned patent US2013020451A1 lacks versatility, maneuverability and practicality, which represents a series of disadvantages due to the fact that most of the touch screen electronic devices are portable and the possibility of instantaneously adjusting the devices on any type of surfaces is now a necessity.

DESCRIPTION OF THE INVENTION

As a solution to the aforementioned problems, the present invention was developed. This invention deals with a kit for holding and mounting portable touch screen electronic devices in different places quickly, safely and easily.

The kit comprises at least one case, cover, or protective cover for electronic devices, at least one adhesive accessory, and at least one strap; wherein the protective case, cap, or cover comprises at least one hook and loop fastening element positioned, joined, adapted, adhered, coupled, connected, configured, or adjusted to its structure; The whole kit provides a greater level of versatility, maneuverability, and practicality to the functions of the hardware of the electronic device. The details of each of the accessories that make up the kit are detailed below:

At least one protective case or cover, which protects the portable electronic device, can be of any size, material or shape characterized in that it comprises at least one hook and loop fastening element; said fastening element is incorporated on any part of the outer surface of the body of the case, rear cover, or protectors.

At least one adhesive accessory, comprising two bodies: the first body has tiny hooks; the second incorporates even smaller and "hairy" loop. When joining the two bodies, the hooks are hooked in the loops and the two parts are firmly affixed once pressed together. When separating them, pulling the hook and loop surfaces, or peeling them off, the fasteners make a characteristic tearing sound.

the external walls of the accessory comprise an adhesive, of any type, which allows adherence to most materials such as: wood, glass, metal, most plastics, ceramics, cement, rock, fibers, and many other elements or materials. For example, allows adherence to furniture, vehicle parts, aircraft parts, walls, training equipment, appliances, cases and more. The adhesive is protected by a removable cover, preferably PVC, which is lifted or peeled when the user wants to affix the attachment to their preferred surfaces. Finally, the hook and loop adhesive fastener accessory can be of any color, size, special shape, logo, character or design.

3. At least one double-sided belt, where the total or partial surface area of one of the faces of the belt comprises tiny hooks, while the total or partial surface area of the other side of the belt comprises even smaller and "hairy" loops. By joining the two sides, the hooks are hooked in the loops and the two parts are firmly affixed once pressed together, forming a joining system that provides greater security at the time of use, by adjusting the device around different areas, such as: seats, headrests of a vehicle, vehicle visor, racks, and many other surfaces. The double-sided strap can be of any thickness, size, color or other aesthetic or design feature; according to the needs of the user.

Any of the accessories that make up the kit, either the case or protective cover, the adhesive accessory, or the strap; they can be joined and separated conveniently by the user, thanks to the provisions of the hook and loop fastener that each of these possess; which generates a secure union without the need to use tools or alternative elements.

The presentation of the kit is provided in one or more colors and special designs; including transparent designs to provide consumers with options to meet the needs of their devices. In addition, the kit appears in a variety of shapes, designs, sizes and types for any desired utility.

BRIEF DESCRIPTION OF THE FIGURES

FIG. 1-A, shows the front view of the adhesive attachment with hook and loop fastener.

FIG. 1-B, shows a front view of the two bodies of the adhesive accessory: the first body has tiny hooks; the second incorporates even smaller loops;

FIG. 1-C, a front view of the two faces of the double-sided belt is shown, where the total surface area of one of the faces comprises tiny hooks, while the total surface area of the other side comprises ribbons of even smaller loops;

FIG. 1-D, shows a front view of the two faces of the double-sided belt, where the partial surface area of one of the faces comprises tiny hooks, while the partial surface area of the other side comprises even smaller loops;

FIGS. 1-E, 1-F and 1-G, show a wide variety of shapes, designs and sizes of the adhesive attachment with hook and loop fasteners;

FIGS. 2-A, 2-B, 2-C, 2-D, 2-E, 2-F and 2-G, show a wide variety of shapes, designs and sizes of double-sided straps with hook and loop fasteners;

FIG. 3-A, shows an isometric view of the adhesive attachment with hook and loop fasteners; where the external walls of the accessory comprise an adhesive, of any type, that allows the accessory to affix to most surfaces and different locations. The adhesive is protected by a removable cover, preferably made of PVC, which is lifted or peeled when the user wants to affix the adhesive accessory to their preferred surface.

FIG. 3-B, an isometric view of the double-sided belt is shown, where the total surface area of one of the faces of the belt comprises tiny hooks, while the total surface area of the other side of the belt comprises even smaller loops;

FIGS. 4-A and 4-B, show a front view of the adhesive accessory that can be of any color, size, special shape, logo, character or design;

FIGS. 5-A and 5-B, show a front view of the protective cover or lid for the portable electronic touch screen device commonly known as smartphone, Android phone, iPhone, tablet, iPad and all similar devices, with hook and loop fasteners; characterized in that it comprises at least one hook and loop fastener; said fastener is incorporated in any part of the outer surface of the body of the cover;

FIG. 6-A, illustrates a portable touch screen electronic device that carries the case or rear cover characterized in that it comprises at least one hook and loop fastener, which is at the same time attached to the double-sided strap by the hook and loop fastener; where the double-sided belt can be of any size and thickness, depending on the use;

FIG. 6-B illustrates a portable touchscreen electronic device comprising two adhesive accessories, which at the same time is attached to the double-sided strap by means of the hook-and-loop fastener; where the double-sided belt can be of any size and thickness, depending on the use;

FIGS. 7-A and 7-B, shows an isometric view of the double-sided strap with hook and loop fastener attached to a headrest of a vehicle;

FIGS. 7-C and 7-D, illustrates a portable touchscreen electronic device that has a protective cover or lid with a hook and loop fastener, which is attached to the headrest of a vehicle by the hook and loop double-sided strap;

FIGS. 8-A and 8-B, illustrates a portable touchscreen electronic device that has an adhesive hook and loop fastener attached to its case or rear cover.

PAIRS OF THE FIGURES (LEGEND)

1. Case or Protective Cover
2. Adhesive accessory
   2.1. Adhesive
   2.2. Removable Cover
3. Double-sided hook and loop strap
4. Hook and loop fastener
   4.1. Hooks
   4.2. Loops
5. Portable electronic device

PREFERRED EMBODIMENT OF THE INVENTION

The present invention provides a kit for holding and mounting portable touch screen electronic devices using at least one hook and loop fastener member of temporary or permanent affixation (4); said fastener allows the electronic device (5) to adhere and/or separate instantaneously with "adhesion force" to many surfaces thus granting a greater level of versatility, maneuverability and practicality to the functions of the electronic device (5) in use.

The kit comprises at least one case, protective cover or case (1), at least one adhesive accessory (2) and at least one double-sided strap (3); All of these accessories can be of any color, size, special shape, logo, character design, or type; wherein at least one of these accessories is securely fixed to the structure of the electronic device (5) and also to the area selected by the user. The general purpose of the present invention is to add a new feature to the electronic device (5), and a new and more convenient way to use them.

As shown in FIGS. 1-C, 1-D, 2-A, 2-B, 2-C, 2-D, 2-E, 2-F and 2-G, the total or partial surface area of one of the faces of the belt (3) comprises tiny hooks (4.1), while the total or partial surface area of the other side of the belt (3) comprises even smaller and "hairy" loops (4.2).

The method of adding, pasting, wrapping, configuring, adjusting or connecting is due to the features of the hook and loop fastener (4) that use the accessories that make up the kit; these are also designed for the structure of any smartphone, Android phone, iPad, tablet and all similar devices, with the main objective of granting the user a variety of new ways to enjoy and use the various electronic devices (5); Also, the kit offers great versatility, since it can be applied to most surfaces, and then subjected to extreme heat, cold, wet, or windy conditions.

The method of adding, adhering, wrapping, configuring, adjusting or connecting is due to the provisions and characteristics of the hook and loop fastener (4) technologies used by the accessories that make up the kit; these are designed for the structure of any smartphone, Android phone, iPad, tablet and similar devices, with the main objective of granting the user a variety of new ways to enjoy and use the various electronic devices (5); Wherein, the kit offers great versatility, since it can be adjusted to different climatic conditions and used for different purposes.

There are several preferred embodiments of how to use and combine the accessories of the kit, which are illustrated in FIGS. 5, 6, 7A-7B, 8, 9A-9B and 10¬; wherein the electronic touch screen device (5) comprises at least one of the accessories of the kit, whether connected, adapted, configured, adhered, hooked, wrapped or adjusted to its structure; this includes at least one fastening portion that allows the device to have superior mounting power without any other element or material.

In conclusion, FIGS. 5, 6, 7A-7B, 8, 9A-9B and 10¬ of the present invention, present a particular method for joining, adapting, configuring, adhering, wrapping, connecting, or adjusting at least a fixing member to the touchscreen electronic device (5); and a particular method for placing, mounting or holding one or more electronic devices with at least one of the accessories that make up the kit on any type of materials such as: wood, glass, metal, most plastics, ceramics, cement, rock, fibers, and many other elements or materials. For example, allows adherence to furniture, vehicle parts, aircraft parts, walls, training equipment, appliances, cases and more.

What is claimed is:

1. A kit for holding and mounting portable touchscreen electronic devices using at least one hook and loop fastener member of temporary or permanent affixation (4) comprising;
    at least one cover or protective cover (1) that protects the portable electronic device (5) characterized in that it comprises at least one hook and loop fastener (4) which is permanently incorporated in any part of the outer surface of the body of the case or cover;
    at least one adhesive accessory (2) comprising two bodies: the first body has hooks (4.1), the second incorporates loops (4.2);
    and at least one double-sided strap (3) whose surface area of one of the faces comprises hooks (4.1), while the surface area of the other side of the belt (3) comprises loops (4.2).

2. The kit of claim 1, wherein said kit holds and mounts the portable electronic devices using at least one hook and loop fastener member of temporary or permanent affixation (4), characterized in that the external wall of the accessory (2) comprises an adhesive (2.1) that allows affixation to most types of materials and elements.

3. The kit according to claim 1, wherein said kit is characterized in that the adhesive (5) is protected by a removable cover (2.2) which is peeled before affixing the fastener to the case, cover, or surface of the electronic device.

4. The kit according to claim 1, wherein said kit is characterized in that the protective cover (1), the adhesive accessory, (2) and the double-sided strap (3); can be of any color, size, special shape, logo, character design, or type.

5. The kit according to claim 1, wherein said kit is characterized in that the case or protective cover (1), the adhesive accessory, (2) and the strap double-sided (3); they are designed to be used repetitively to affix daily.

6. The kit according to claim 1, wherein said kit is characterized in that the protective cover (1), the adhesive accessory (2) and the double-sided strap (3); can be mixed and combined with different sizes and quantities.

7. A method of using the parts that conform the kit of claim 1 to hold and mount portable touchscreen electronic devices, said method comprising the steps of:
    1. Any of the three accessories that make up the kit, either the case or protective cover, the adhesive accessory, or the strap; they may be joined and separated one to another in any way possible when convenient by the user, thanks to the provisions and features of the hook and loop fastener that each of these possess; which generates a secure and firm adjustment or union, without the need to use tools or other alternative elements,
    2. The use of the kit parts specially designed for said portable electronic devices with the main objective of granting the user a variety of new ways to enjoy and use the various electronic devices (5); also, the kit offers great versatility, since it can be applied in various surfaces, and then subjected to extreme heat, cold, wet, or windy conditions,
    3. The kit presentation is characterized for presenting one or more colors and/or special designs; including transparent designs,
    4. The kit can appear in a variety of shapes, designs, sizes and types for any desired utility.

\* \* \* \* \*